US00RE41271E

(19) United States
(12) Reissued Patent
Vaida

(10) Patent Number: US RE41,271 E
(45) Date of Reissued Patent: Apr. 27, 2010

(54) AIRCRAFT FLIGHT RISK MEASURING SYSTEM AND METHOD OF OPERATION

(76) Inventor: Theodore F. Vaida, 850 Popes Valley Dr., Colorado Springs, CO (US) 80919

(21) Appl. No.: 11/896,497

(22) Filed: Aug. 31, 2007

Related U.S. Patent Documents

Reissue of:
(64) Patent No.: 6,940,426
Issued: Sep. 6, 2005
Appl. No.: 10/655,031
Filed: Sep. 5, 2003

(51) Int. Cl.
*G08B 23/00* (2006.01)

(52) U.S. Cl. ..... 340/963; 340/945; 701/14; 701/25

(58) Field of Classification Search ..... 340/945, 340/961, 963; 701/3, 7, 9, 14, 25, 33, 35, 701/301, 302; 702/144
See application file for complete search history.

(56) References Cited

U.S. PATENT DOCUMENTS 5,890,079 A * 3/1999 Levine ..... 701/14
6,003,808 A 12/1999 Nguyen et al.
6,181,990 B1 * 1/2001 Grabowsky et al. ..... 701/14
6,208,955 B1 3/2001 Provan et al.
6,278,913 B1 8/2001 Jiang
6,529,620 B2 3/2003 Thompson
6,546,338 B2 4/2003 Sainthuile et al.
6,633,801 B1 10/2003 Durlacher et al.
6,751,536 B1 6/2004 Kipersztok et al.
6,816,762 B2 11/2004 Hensey et al.
7,113,852 B2 * 9/2006 Kapadia et al. ..... 701/33

* cited by examiner

*Primary Examiner*—Toan N Pham
(74) *Attorney, Agent, or Firm*—Sterne, Kessler, Goldstein & Fox P.L.L.C.

(57) ABSTRACT

An aircraft flight risk measuring system for analyzing risks related to a flight of an aircraft. A user of the risk measuring system can be a flight dispatcher, an owner/operator, a pilot and other interested parties. The risk measuring system includes a risk management server system computer. The system computer has a two-way communication with a user computer operated by the user. An accident history database is connected to the system computer for providing accident reports related to the aircraft and other accident data. Also, a navigation database is connected to said system computer for providing airspace data, radio navigation aids, preferred routes, elevation data, geographic data and information related to a destination airport. Further, a non-static database is connected to the system computer for providing live information related to weather forecasts and data related to the aircraft's flight. As an option, a two-way communication between said system computer and an aircraft computer on board the aircraft can be included. The two-way communication used for receiving and transmitting encoded data from the aircraft when the flight is in progress.

41 Claims, 4 Drawing Sheets

AIRCRAFT FLIGHT RISK MEASURING SYSTEM AND METHOD OF OPERATION

Matter enclosed in heavy brackets [ ] appears in the original patent but forms no part of this reissue specification; matter printed in italics indicates the additions made by reissue.

BACKGROUND OF THE INVENTION (a) Field of the Invention

This invention relates a system for measuring aviation risks for improved aircraft safety and more particularly, but not by way of limitation, to an aircraft flight measuring system for providing a flight planning aid to a pilot, flight dispatcher and an owner/operator. The new aircraft flight measuring system calculates various risk factors and provides a summary report. The report can be used prior to flight time or during flight to aid in a decision to fly or not or to change a flight destination.

(b) Discussion of Prior Art

Prior to any aircraft flight under Federal Aviation Administration (FAA) regulations, a pilot must create a flight-plan, which identifies the specifics of the intended flight. The process can be performed on paper or using a number of different electronic methods including a microcomputer or the internet, serviced by web browser. This process is intended to ensure that the flight will arrive safely. In some cases, the pilot may elect to provide his or her flight plan to a Flight Service Station (FSS) for entry into the Air Traffic Control (ATC) system. However, for flights in Visual Meteorological Conditions (VMC), this is not mandatory.

In flight planning, an implied risk management function is a weak link due to human factors, which may affect the pilot. For these reasons, the FAA has established a set of regulations in the Code of Federal Regulations (CFR) for commercial flight, which require additional restrictions to be met before a flight can proceed. One of the restrictions includes a use of an independent dispatcher. The dispatcher must be someone not part of the required aircraft crew. The addition of the dispatcher is intended to provide an impartial review of the flight to aid in decision-making and enhance safety. Several non-governmental organizations exist for the purpose of educating the pilot population such as the Airplane Owners and Pilots Association (AOPA) and their sister agency the AOPA Air Safety Foundation. These groups provide free and low-cost seminars, videos and self-education materials to the general public. Several educational materials vendors including King Aviation Schools provide self-education materials, books, video and distance learning. In either case the pilot must already be aware of the risks inherent in flight, or be encouraged to take the courses and attend seminars, participation at these events is entirely voluntary although encouraged by the FAA.

Commercial flight training companies such as Flight Safety International provide continuing education services for fleet operators and air-taxi services. These companies provide type certifications re-currency and Crew-Resource-Management (CRM). A type-certification is an authorization to act as pilot-in-command of an aircraft, which has been determined by the FAA to require certain aircraft specific knowledge. Pilots are required to maintain "currency", which is a minimum of recent experience in specified operations such as instrument landings, night time takeoffs and landings. CRM are procedures and methods for multi-pilot cockpit operations, which attempt to reduce potential confusion or inter-personal effects in flight. These services are prohibitively expensive for single pilot-single aircraft operations and are specifically targeted at covering regulatory requirement. Risk management is not typically an explicit goal of these services.

During a flight, the pilot is completely in charge of the safety of the flight up to and including diverging from the CFRs when the pilot feels its necessary. In cases of a multi-person crew, the pilot may request and receive advice. However, only one person can be considered the Pilot-In-Command (PIC). Just as in the case of flight planning, human factors can affect a pilot's decision making. Also, this extends to the crew as well. There is significant anecdotal evidence of multi-pilot operations where all the crew members were unable to make correct decisions. In some cases a telecommunication system is available which allows the pilot to speak with ground personnel, however without in flight information the ground crew can rarely be of substantial timely help in resolving in-flight issues.

Finally, although the CFR's require extensive record keeping for maintenance and pilot proficiency, there is no codified method or procedure for evaluating a pilot's skill for the management of risk. Safety training, recurrent training and other methods of educational instruction for pilots have shown some success in helping good pilots sharpen their skills. But, no training can predetermine all possible situations a pilot may encounter.

In U.S. Pat. No. 6,538,581 to Cowie and U.S. Pat. No. 6,043,758 to Snyder, multiple methods for monitoring a flight in progress for collision risk are disclosed. In general, these disclosures are primarily focused on alerting a pilot, a ground controller or owner/operator of a flight in-progress and an impending collision with traffic or terrain. This information is not used to assess pre-flight risk factors or risk factors during flight. In U.S. Pat. No. 5,710,559 to Krogmann, a systemic monitoring device and method is described. This system is focused on alerting a crew of the aircraft to an impending in-flight issue and no pre-flight functions are provided. In U.S. Pat. No. 6,223,143 to Weinstock, general risk management methodologies with software are described. The patent discloses the calculation of failure modes and associated risks using various computational algorithms. These algorithms are based on engineering analysis of possible point failures in the system and mission analyzed. The underlying vehicle specific failure information is static and can be reused. But, for each mission the user of the system must manually create a detailed analysis of the route and other relevant mission specific data. By contrast, the subject invention is intended to gather failure probabilities from historical accident data and uses existing flight-planning information to computationally create a mission data report used for risk factor analysis.

None of the above-mentioned prior art patents specifically disclose the unique features, combination of components and function of the subject aircraft flight risk measuring system and method of operation as described herein.

SUMMARY OF THE INVENTION

In view of the foregoing, it is a primary objective of the subject invention to provide a pre-flight data report or an in-flight data report for an assessment of risk level associated with a particular flight segment. The report is used to assess data prior to flight or between take-off and landing. The information from the report can be used by a pilot, a flight dispatcher, an owner/operator or other interested party in making a better decision for overall flight planning.

Another object of the invention is to provide an impartial second opinion when flight safety can be improved. The report can also function as a monitor for the in-flight aircraft to allow a ground based dispatcher or other interested party to take preventative action when needed.

Yet another object of the new aviation risk measuring system is to gather failure probabilities from historical accident data with existing flight-planning information for creating a flight mission data summary report. The summary report provides a risk factor analysis to a user.

The subject invention provides a system and method of operation using an analysis of risk related to the flight of an aircraft. The system includes a source of flight planning data, a source of real-time aircraft data, historical flight information data, navigation and geographic data and a risk management server system computer to analyze the collected data. The method of operation uses the available data to generate a summary report of the level of risk associated with a planned flight or a current flight activity if real-time data is available.

These and other objects of the present invention will become apparent to those familiar with various systems and methods of measuring aircraft flight risks when reviewing the following detailed description, showing novel construction, combination, and elements as herein described, and more particularly defined by the claims, it being understood that changes in the various embodiments of invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which.

DETAILED DESCRIPTION OF THE PREFERRED EMBODIMENTS

Figure 1:
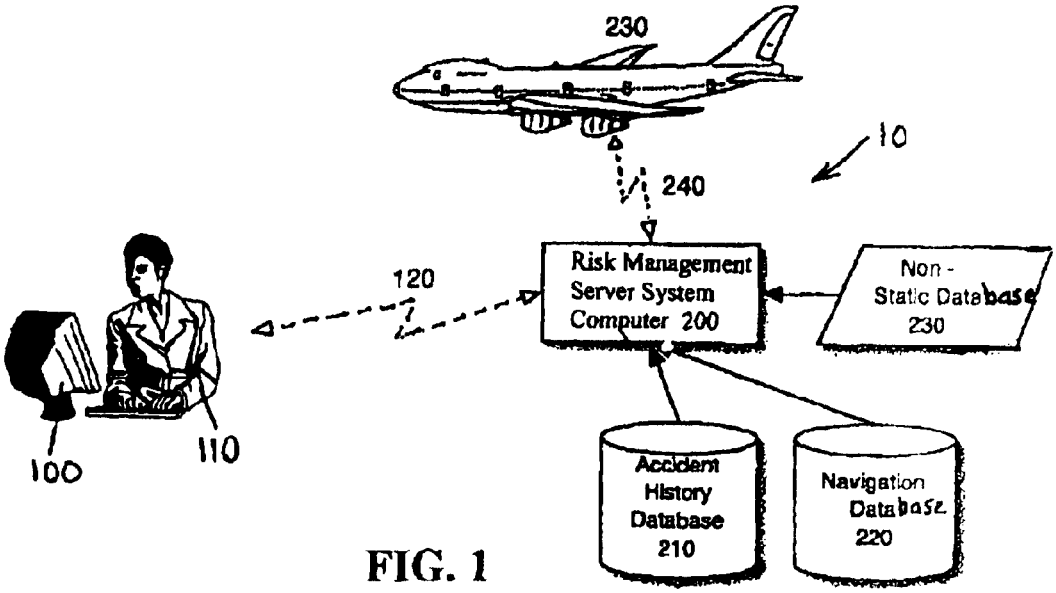
FIG. 1 is a diagram illustrating broadly the subject aircraft flight risk measuring system.

In FIG. 1, the aircraft flight measuring system is shown having general reference numeral 10. The system 10 broadly includes a Risk Management Computer Server System (RMSS) computer 200 with access to an accident history database 210, access to flight navigation database 220 and access to a non-static database 230. The RMSS computer 200 has a two-way communication 120 with a user's computer 100, which provides an interface for a user 110 to access the system's computer 200. Also, the RMSS computer 200 provides for two-way communication 240 with an aircraft 230 prior to flight time and during flight. During flight, the aircraft 230 can communicate flight progress and various situation data to the RMSS computer 200.

The RMSS computer 200 can be any computer, which can run software and algorithms specific to the system 10 as described herein. The RMSS computer 200 can include one or more general purpose microcomputers with an operating system configured to run software which handles queries from the user 110 and has access to the databases 210, 220 and 230. Also, the computer 200 has access to various articles, training material and other information sources for risk management education when reports are presented. The system is also programmed to identify and input material that is relevant to a proposed flight.

The accident history database 210 or also called a quantized risk factor database is constructed from accident reports from NTSB records, indexed and stored in a manner which allows for arbitrary searches of the records. Also, additional databases can be included from summaries of accident data such as that provided by the AOPA Air Safety Foundation Nall Report, or data from non-government and international accident investigation agencies.

The navigation database 220 consists of geographical information, particularly terrain elevation data, ground cover and other landform data which may have risk implications, airspace data, radio navigation aids, waypoints and preferred routes. Also, the database 220 includes information about airports including types and quality of instrument approaches as well as field services available and other relevant data points which have risk implications.

The non-static database 230 provides live information of primary importance such as weather data with high reliability forecasts covering a time period during the flight of the aircraft 230. Additional data may include current traffic flow information in and around the flight of the aircraft 230 from the National Airspace System (NAS) and any other data, which may change rapidly and may effect the flight of data 230.

The user 110 can access the RMSS computer 200 through his or her computer 100 or another data communication terminal, which can include a cell phone, a Personal Digital Assistant (PDA) or the Internet. The RMSS computer 200 also runs software which provides a text or graphical user interface and allows the user 110 to input flight planning data and to receive human readable summary reports. The computer 200 can also be more than one device, with a fixed ground based terminal used for primary pre-flight operations and a secondary terminal provided by a portable device and/or devices mounted in the aircraft 230 for use before or during flight.

Where possible the RMSS computer 200 receives encoded data from the flight in progress of aircraft 230 via the two-way data communication 240. This feature enables the RMSS computer 230 to track the real operation of the aircraft 230 for comparison against the estimated flight plan, which was presented prior to flight. While this feature is important, it is optional and is not required for all implementations of the present invention. But, it is useful for extending the capabilities and quality of aircraft flight risk management. When the aircraft 230 is equipped with the necessary hardware and software, it can generate and deliver a stream of data or a series of discrete reports to the RMSS computer 200, with the status and progress of the flight in real-time.

Figure 2:
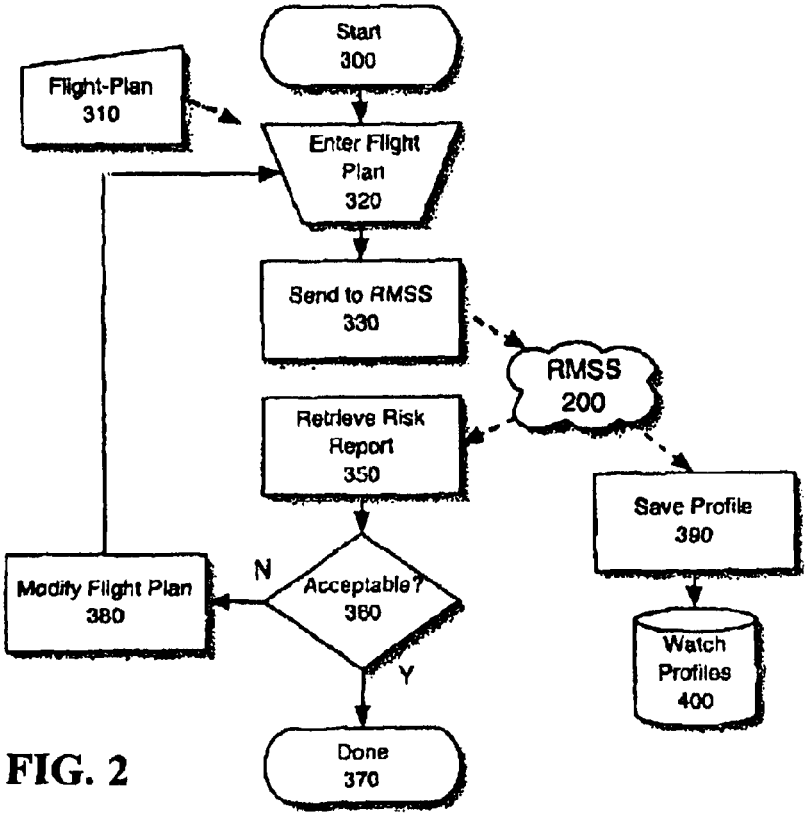
FIG. 2 is a logic diagram illustrating the process by which a user interacts with the system.

In FIG. 2, a logic diagram shows a user interaction process for requesting and utilizing the risk management reports from the RMSS computer 200. When a pilot of the aircraft 230 or the user 110 is preparing for a flight, the computer 200, with accompanying software, is started at start 300 and a flight plan 310 is submitted. An enter flight plan 320 is encoded into the system and a send to RMSS 330 is sent to the RMSS computer 200. Obviously, the user will use the two-way data communication 120 and the pilot will use the two-way data communication 240. When the flight plan is received by the RMSS computer 200, it can be optionally stored or save profile 390 in a persistent database called a watch profiles 400. The data in the watch profiles can be used later during the actual flight of the aircraft 230.

The user 110 or pilot of the aircraft 230 can then query the RMSS computer 200 for a report generated from the data provided. A retrieve risk report 350 is now generated. The user or the pilot can then make a determination based on available data, including but not limited to the retrieve risk report 350 on whether the flight is acceptable 360 or not. If the risk report 350 is unacceptable because the calculated risk is too high, the user or pilot may elect to modify the flight plan 380 and submit a new plan for analysis. The process described above is then repeated. If the user or pilot is satisfied with the proposed flight, the process is completed and done 370.

Figure 3:
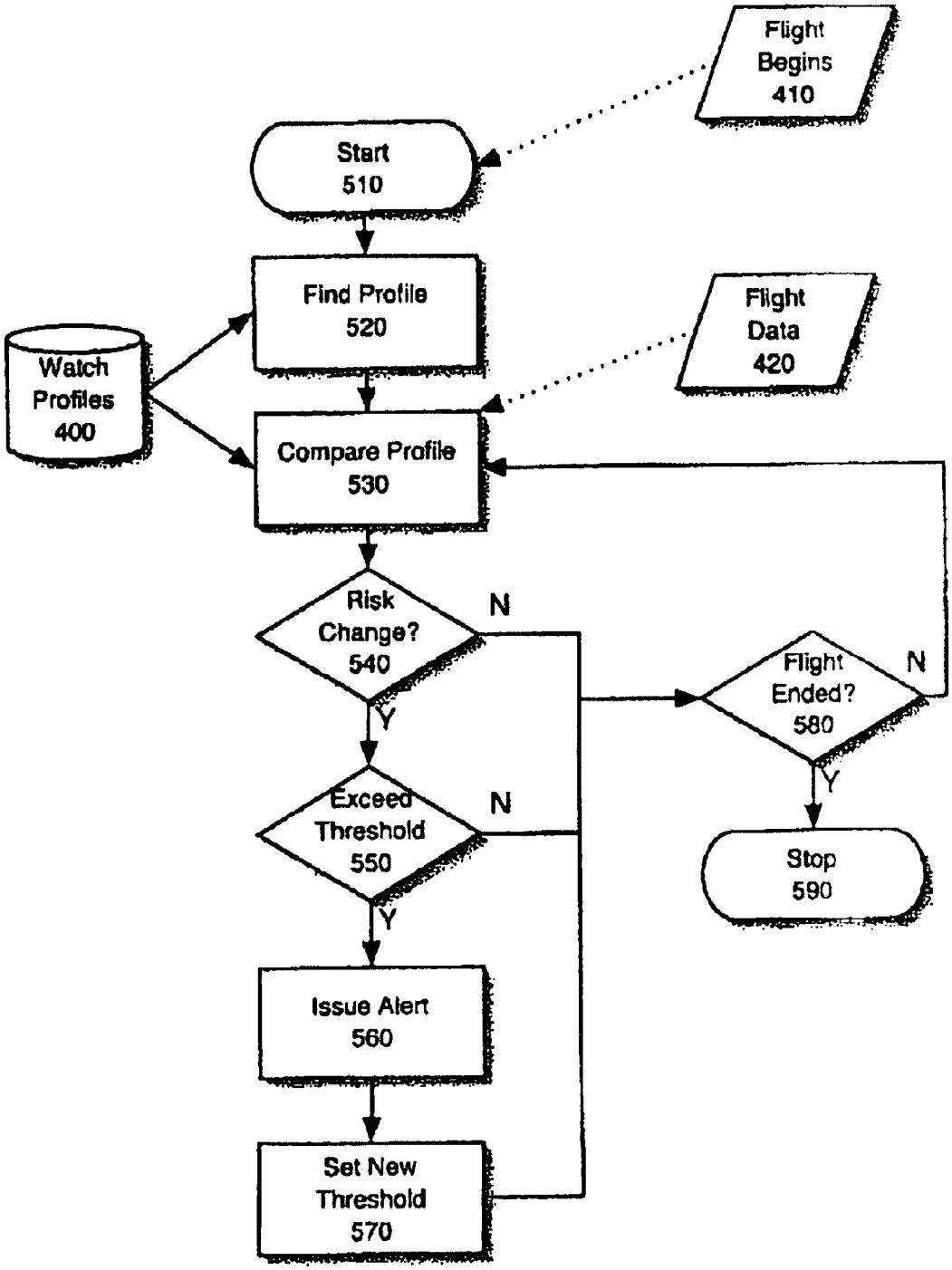
FIG. 3 is a logic diagram illustrating the process by which the aircraft flight measuring system watches an in-progress flight to determine changes in risk factors.

In FIG. 3, a logic diagram illustrates a process by which the RMSS computer 200 can be used to monitor flights in progress for changes in risk factors. This is an optional feature and is not necessary for basic operation of the system 10. When the aircraft 230 is equipped as described above with the two-way communication 240 and the flight begins 410, the RMSS computer 200 is activated and the flight plan previously entered into the system is accessed. A signal from the aircraft causes the RMSS computer to start a new program 510, load software and/or any other actions required to perform the necessary calculations.

The first action or find profile 520 is taken to find the stored flight plan in the watch profiles 400. The records in this database contain the details of the flight plan as entered, calculated risk factors from the original flight plan, and references to any non static data used for the calculation such as weather reports.

With the watch profiles 400 located, the server computer 200 begins a monitoring function. When a report or a continuous stream of data is received from the monitored aircraft 230, the computer 200 compares a compare profile 530 of the real-time flight data against the watch profiles 400 for any discrepancies, changes in the risk factors and changes in the non-static data. If there is sufficient a differential between the compare profile 530 and the flight data 420 received the computer 200 recalculates risk change 540. If the risk change 540 calculation is sufficiently different from an exceed threshold 550, the computer 200 sends an issue alert 560 signal to the user's computer 100 or the aircraft 230.

Once the issue alert 560 signal exists, the RMSS computer updates the watch profiles 400 records with a set new threshold 570 for future comparisons. The watch profiles 400 now retains the original risk calculation. Also user preferences may be set to request alerts at any time where the current risk calculation exceeds a threshold over the last risk calculation or the original calculation. In certain cases as requested by the user 110, the original threshold may be retained and the system will differentiate between risk calculates that exceed the new threshold 570 and the original threshold. Once the risk calculations are complete, the computer 200 checks for an end of flight condition or flight ended 580. If the flight is completed, the process is now stopped 590 and is recorded. If the flight is still in progress, the process repeats itself and the compare profile 530 is started again.

Figure 4:
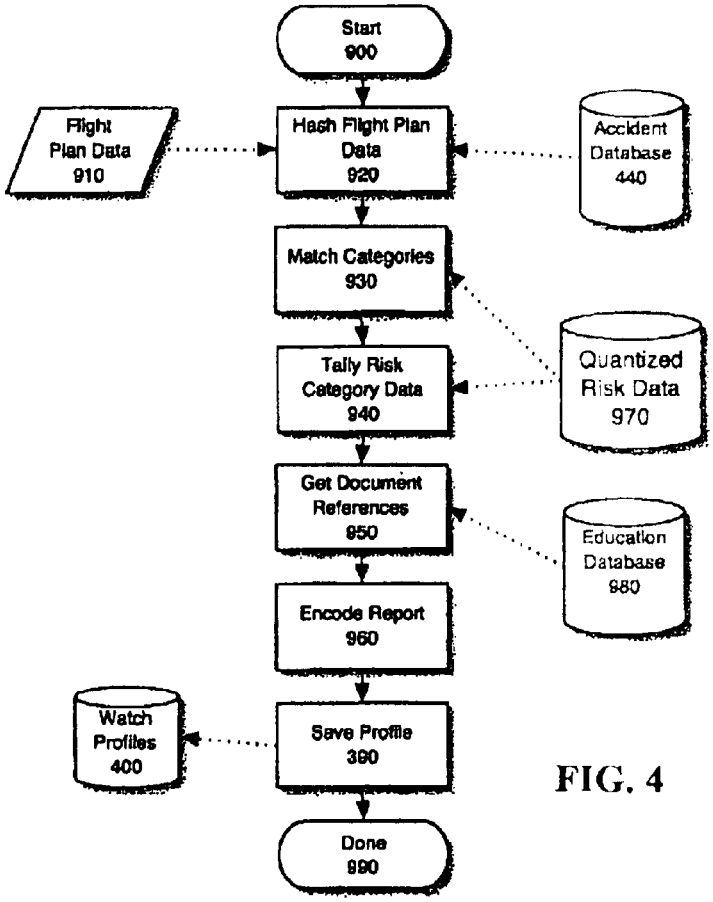
FIG. 4 is a logic diagram illustrating the process by which the system calculates the risk profile and generates a report.

In FIG. 4, a logic diagram is shown describing a process by which the RMSS computer 200 creates a risk report from a flight plan when a request is received from the user's computer 100. When flight plan data 910 is received, the RMSS computer 200 creates an execution thread, loads software and performs other actions to begin a process start 900. The first action is to provide a hash flight plan data 920. Hashing operations are a well known computer science strategy wherein a piece of data is converted into a smaller, quickly searchable value for retrieving a record marked with a hash key. The program software can then hash the request data and find a matching entry in the database. In this case, the hashing function is an operation which converts the raw flight plan data into a single alphanumeric 'hash key' which is also used to index the records in the accident database 440. The accident database 440 processes which records are matched by the hash-key and share common risk factors. The actual algorithm used for this process is generated by processes described below in this disclosure. One flight plan may generate one or more hash keys depending on the algorithm used and the optimal function of the RMSS computer 200 system. This hash is then used to search for a sampling of matching accident reports, which are selected into a randomized list. From this list, a number of reports are selected based on user preference for later display.

Once the hash key has been generated, the program creates a list of quantized risk match categories 930, which match the flight plan. Each match category 930 describes a closed set of historical accidents based on a common searchable and identifiable factor, with quantized risk data 970. The risk data 970 is based on historical accident information. The algorithm, which generates the match category 930, is generated by a process described below.

With the list of categories compiled by the RMSS computer 200 a tally risk category data 940 is generated. This step provides a list of the risk factors. For each risk factor identified, a corresponding risk score stored in the quantized risk data 970 is read and used to rank each risk factor. An array is generated to hold and sort the risk factors. An education database 980 is then searched from get document references 950. The references may be various documents, hyperlinks, or other educational materials which are specific to an identified risk factor. The number of materials selected is based on user preference and may reflect a history of materials viewed by the user 110.

With the accident reports, risk categories, risk score and educational material, an encode report 960 is rendered as a computerized summary report. The report may be a human readable text document, a HTML document or XML encoded data which can rendered by a data-terminal. The report contains the summarized total risk score, and detailed categories presented by rank, accident reports and educational materials. The report is then downloaded to save profile 390 and watch profiles 400. The program is then completed or done 990.

Figure 5:
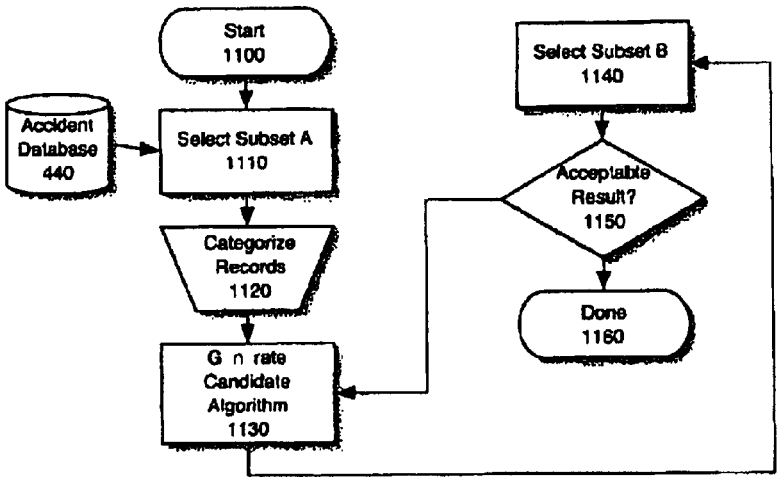
FIG. 5 illustrates a logic diagram used to verify one or more algorithms used for a categorization of accident data and flight plans.

In FIG. 5, a "boot-strap" process is generated to verify one or more algorithms used for a categorization of accident data and flight plans. The process is built progressively using human input to automated categorization of records. The first step requires human input and verification of the operation of the algorithm. The process begins with start 1100 and a selection of a statistically select subset A 1110 from the accident history database 440. This data is then presented to the operator to create categorize records 1120. Each record is categorized to provide a basis for training and/or selecting algorithms. Once this is complete the categorized records are used to generate candidate algorithm 1130. This phase involves method steps described in logic diagram FIG. 6. Once a candidate algorithm 1130 has been selected, a second statistically valid subset of the accident data or select subset B1140 is created. This subset is selected and executed to create an output set which is reviewed by the operator to check for validity. If the candidate algorithm is not an acceptable result 1150 then a new candidate is generated using the step of generate candidate 1130. If the algorithm is acceptable, the process is complete and done 1160.

Figure 6:
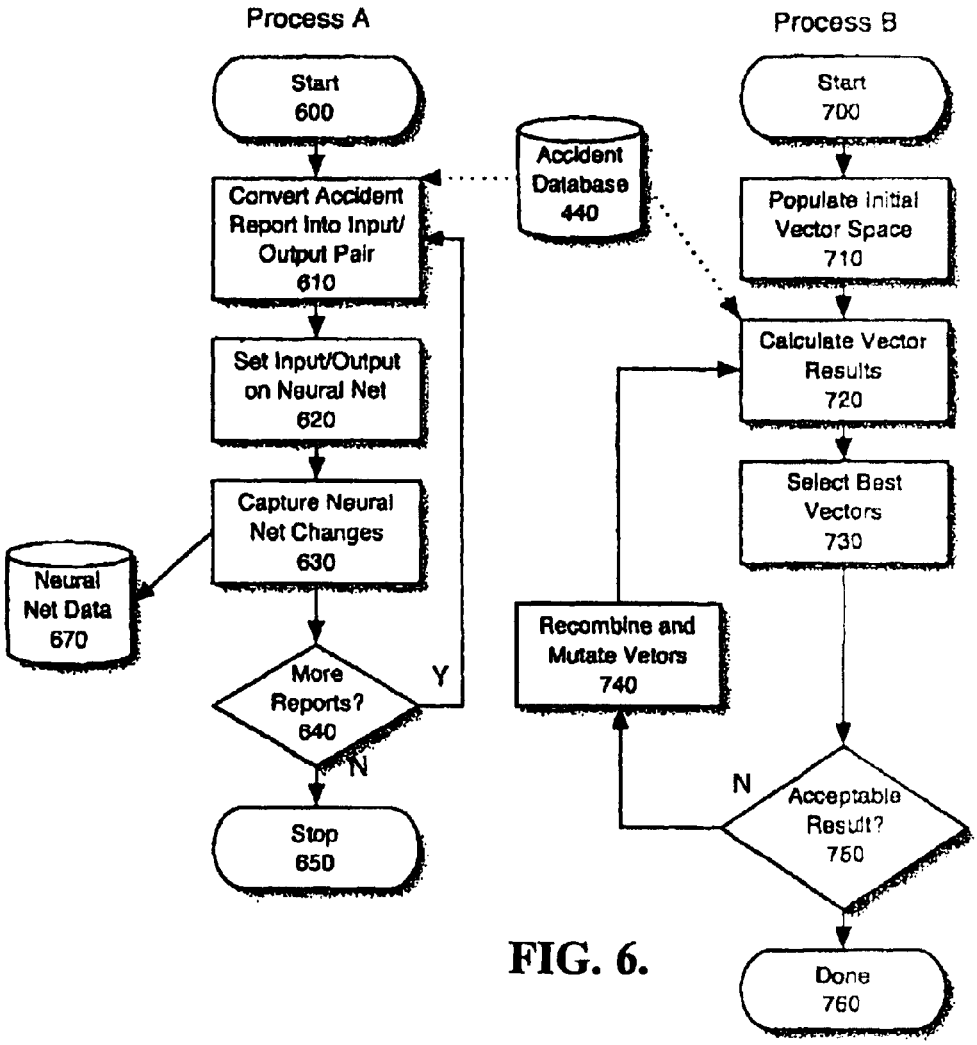
FIG. 6 shows two logic diagrams illustrating processes used to create and select a categorization algorithm.

In FIG. 6, two preferred methods are logic diagrammed for generating candidate algorithms. It should be mentioned that those skilled in the art of creating algorithms of this type will understand that there are other methodologies for creating or selecting an algorithm to perform the categorization of accident data as described herein.

The first method for generating a categorization algorithm is shown as Process A. This process uses a neural-network filtering function. For a neural network to operate it must be 'trained' by the presentation of inputs and expected outputs. While this system refers to the neural net in a manner consistent with a software calculated implementation, it should be understand that a neural net may be embodied through fixed hardware, programmable logic, software algorithms or other methods as required for speed, flexibility and other implementation considerations. The neural network is designed to accept the flight plan data, and output a list of applicable categories that match the flight plan.

When accident data is available for use in the training process, the RMSS computer 200 is engaged and the program starts with start 600. The program selects a record from the set of data presented and processes the record into an input/output pair 610, which is suitable for the structure of the neural set. The set of input/output 610 is presented to a set input/output on neural net 620 and then a training function is engaged to capture neural net changes 630, which are then stored for servicing user requests. If more accident data is available for training then the process is repeated for more reports 640. When all of the data has been applied, the process is completed and stops 650.

A second method is illustrated as Process B. This method is for preparing the system 10 utilizing a genetic algorithm process to create a non-linear filtering algorithm. The process uses selection and recombination operations to progressively improve an arbitrarily coded algorithm until it meets some threshold of acceptability, with a single algorithm being selected from a pool of algorithms. Each of the algorithms is encoded as a 'vector', and each vector is executed to produce a result.

The selection processes begins when a set of data is selected to be applied and the software loaded at start 700. A set of pseudo-random vectors is generated to populate the initial vector space 710. Each vector is executed with the step of calculate vector results 720 from the data set and produce a result set. The result set is examined to select best vectors 730. If any vector meets the acceptable result 750, then the process is complete or done 760. If no vector is suitable, the best vectors are sent to recombine and mutate vectors 740. This step produces a new pool of vectors and the process begins executing again at calculate vector results 720.

Figure 7:
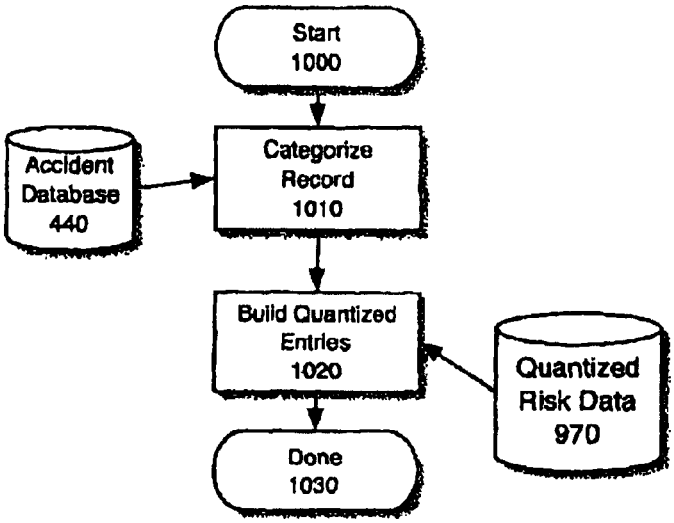
FIG. 7 illustrates a logic diagram by which an accident database is converted into the quantized database.

In FIG. 7, a logic diagram is shown illustrating the process steps to create the quantized risk data 970 used for generating flight plan reports. The process begins at start 1000. A set of historical accident data from accident database 440 is run initially and each time new accident data is added to the database as it becomes available. For each record, the system 10 uses one or more categorization record 1010 algorithms, as described above. The quantized risk data 970 is generated from build quantized entries 1020. The records that contain the total number of accidents are selected by this category and the relationship between incidents, injuries and fatalities are compared. Also, records are compared that contain the total number of hours, operations, flights and operational data. From this data, a summary report with a percentage of chance risk of an accident per hour of flight operation is generated. The report is then completed and done 1030.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

What is claimed is:

1. An aircraft flight risk measuring system for analyzing risks related to a flight of an aircraft, a user of the system can be a flight dispatcher, an owner/operator, a pilot and an interested party, the risk measuring system comprising:

a risk management server system computer, said system computer having a two-way communication with a user computer;

an accident history database connected to said system computer for providing accident reports related to the aircraft and other accident data;

a navigation database connected to said system computer for providing airspace data, radio navigation aids, preferred routes, elevation data, geographic data and information related to a destination airport; and a non-static database connected to said system computer for providing live information related to weather forecasts and data related to the aircraft's flight.

2. The risk measuring system as described in claim 1 further including a two-way communication between said system computer and an aircraft computer on board the aircraft, the two-way communication for receiving and transmitting encoded current data from the aircraft when the flight is in progress wherein said user computer is an aircraft computer on board an aircraft.

3. The risk measuring system as described in claim 2 further including a flight data plan inputted to said system computer from said user computer prior to the flight of the aircraft.

4. The risk measuring system as described in claim 2 further including a flight alert signal sent to said aircraft computer from said system computer when a risk threshold is reached, the risk threshold reached by said system computer when processing certain data received from said accident history database, said navigation database, said non-static database and in-flight data from the aircraft.

5. The risk measuring system as described in claim 1 further including a flight data plan inputted to said system computer from said user computer by the user of the system and prior to the flight of the aircraft.

6. The risk measuring system as described in claim 1 further including a risk management report for review by the user of the system, said report generated by said system computer based on data received from said accident history data, said navigation database and said non-static database.

7. The risk measuring system as described in claim 1 further including a flight alert signal sent to said user computer from said system computer when a risk threshold is reached, the risk threshold reached by said system computer when processing certain data received from said accident history data, said navigation database and said non-static database.

8. An aircraft flight risk measuring system for analyzing risks related to a flight of an aircraft, a user of the system can be a flight dispatcher, an owner/operator, a pilot and an interested party, the risk measuring system comprising:

a risk management server system computer, said system computer having a two-way communication with a user computer;

an accident history database connected to said system computer for providing accident reports related to the aircraft and other aircraft;

a navigation database connected to said system computer for providing airspace data, radio navigation aids, elevation data, geographic data and information related to a destination airport;

a non-static database connected to said system computer for providing live information related to weather forecasts and data related to the aircraft's flight; and a risk management report for output to said user computer for review by the user of the system, said report generated by said system computer based on data received from said accident history database, said navigation database and said non-static database.

9. The risk measuring system as described in claim 8 further including a two-way communication between said system computer and an aircraft computer on board the aircraft, the two-way communication for receiving and transmitting encoded current data from the aircraft when the flight is in progress.

10. The risk measuring system as described in claim 9, further including a flight alert signal sent to said aircraft computer from said system computer when a risk threshold is reached, the risk threshold reached by said system computer when processing certain data received from said accident history data*base*, said navigation database, said non-static database and in-flight data from the aircraft.

11. The risk measuring system as described in claim 9, further including a flight data plan inputted to said system computer from said user computer by the user of the system and prior to the flight of the aircraft.

12. The risk measuring system as described in claim 8 further including a flight data inputted to said system computer from said user computer by the user of the system and prior to the flight of the aircraft.

13. The risk measuring system as described in claim 8 further including a flight alert signal sent to said user computer from said system computer when a risk threshold is reached, the risk threshold reached by said system computer when processing certain data received from said accident history database, said navigation database and said non-static database.

14. The method of measuring aircraft flight risk, a user of the method can be a flight dispatcher, an owner/operator, a pilot and an interested party, the steps comprising:

programming a risk management server system computer for receiving a two-way communication data from a user computer;

inputting accident history data from an accident history database connected to the system computer and providing accident reports related to the aircraft and other aircraft;

inputting navigation data from a navigation database connected to the system computer and providing airspace data, radio navigation aids, elevation data, geographic data and information related to a destination airport; and inputting non-static data from a non-static database connected to the system computer for providing live information related to weather forecasts and data related to the aircraft's flight.

15. The method as described in claim 14 further including the step of providing two-way communication between the system computer and an aircraft computer on board the aircraft and receiving and transmitting encoded current data from the aircraft when the flight is in progress.

16. The method as described in claim 14 including the step of inputting a flight data plan to the system computer from the aircraft computer and prior to the flight of the aircraft.

17. The method as described in claim 15 further including the step of inputting a flight alert signal to the aircraft computer from the system computer when a risk threshold is reached, the risk threshold reached by the system computer when processing certain data received from the accident history database, the navigation database, the non-static database and current in-flight data from the aircraft.

18. The method as described in claim 14 further including inputting a flight data plan to the system computer from the user computer by the user and prior to the flight of the aircraft.

19. The method as described in claim 14 further including outputting a risk management report for review by the user of the system from the system computer based on data received from the accident history database, the navigation database and the non-static database.

20. The method as described in claim 14 further including outputting a flight alert signal to the user computer from the system computer when a risk threshold is reached, the risk threshold reached by the system computer when processing certain data received from the accident history database, the navigation database and the non-static database.

*21. An aircraft flight risk measuring system comprising:*

*a risk management server system computer, said system computer configured for two-way communication with a user computer;*

*an accident history database connected to said system computer for providing accident data;*

*a navigation database connected to said system computer for providing navigation data; and*

*a non-static database connected to said system computer for providing live information related to an aircraft flight.*

*22. The risk measuring system as described in claim 21, wherein said user computer is an aircraft computer on board an aircraft.*

*23. The risk measuring system as described in claim 22, wherein said system computer is arranged to receive a flight data plan prior to a flight of an aircraft.*

*24. The risk measuring system as described in claim 22, wherein said system computer is configured to send a flight alert signal to said user computer when a risk threshold is reached, the risk threshold based at least in part on data received from said accident history database, said navigation database, said non-static database, or said aircraft.*

*25. The risk measuring system as described in claim 21, wherein said system computer is configured to receive a flight data plan prior to a flight of an aircraft.*

*26. The risk measuring system as described in claim 21, wherein said system computer is configured to send a flight alert signal to said user computer when a risk threshold is reached, the risk threshold based at least in part on data received from at least one of said accident history database, said navigation database, said non-static database, and said aircraft.*

*27. The risk measuring system as described in claim 21, wherein navigation data includes at least one of: airspace*

*data, radio navigation aids, preferred routes, elevation data, geographic data and information related to a destination airport.*

*28. The risk measuring system as described in claim 21, wherein said system computer is configured to generate a risk management report based at least in part on data received from at least one of said accident history data, said navigation database and said non-static database.*

*29. The risk measuring system as described in claim 28, wherein said user computer is an aircraft computer on board an aircraft.*

*30. The risk measuring system as described in claim 29, wherein said system computer is configured to send a flight alert signal said user computer when a risk threshold is reached, the risk threshold based at least in part on data received from said accident history database, said navigation database, said non-static database, or said aircraft.*

*31. The risk measuring system as described in claim 29, wherein said system computer is configured to receive a flight data plan prior to flight of an aircraft.*

*32. The risk measuring system as described in claim 28, wherein said system computer is configured to receive a flight data plan prior to flight of an aircraft.*

*33. The risk measuring system as described in claim 28, wherein said system computer is configured to send a data alert signal to said user computer when a risk threshold is reached, the risk threshold based at least in part on data received from at least one of said accident history database, said navigation database, said non-static database, and said aircraft.*

*34. A method for use on a user computer of measuring aircraft flight risk for an aircraft flight, the user computer including a memory and a processor, comprising:*

*receiving accident history data related to said aircraft flight,*

*receiving navigation data related to said aircraft flight;*

*receiving live information related to said aircraft flight, the receiving being performed by the memory; and*

*determining aircraft flight risk for said aircraft flight based at least in part on at least one of the accident history data, the navigation data, and the live information, the determining being performed by the processor.*

*35. The method as described in claim 34, including the step of receiving a flight data plan prior to the flight of the aircraft.*

*36. The method as described in claim 34, further including outputting a risk management report based at least in part on data received from at least one of the accident history data, the navigation data and the live information.*

*37. The method of claim 34, wherein navigation data includes at least one of: airspace data, radio navigation aids, preferred routes, elevation data, geographic data and information related to a destination airport.*

*38. The method as described in claim 34, further including the step of transmitting aircraft flight risk data to the aircraft when the flight is in progress.*

*39. The method as described in claim 35, further including the step of generating a flight alert signal when a risk threshold is reached, wherein the risk threshold is based at least in part on at least one of the accident history data, the navigation data, and the live information.*

*40. A computer readable storage medium having computer program code recorded thereon, that when executed by a processor controlled system, causes the processor controlled system to measure aircraft flight risk for an aircraft flight according to a method, comprising:*

*receiving accident history data related to said aircraft flight;*

*receiving navigation data related to said aircraft flight;*

*receiving live information related to said aircraft flight, the receiving being performed by the memory; and*

*determining aircraft flight risk for said aircraft flight based at least in part on at least one of the accident history data, the navigation data, and the live information, the determining being performed by the processor.*

*41. An apparatus for measuring aircraft flight risk for an aircraft flight, comprising:*

*means for receiving accident history data related to said aircraft flight;*

*means for receiving navigation data related to said aircraft flight;*

*means for receiving live information related to said aircraft flight, the means for receiving including a computer having a memory and a processor; and*

*means for determining aircraft flight risk for said aircraft flight based at least in part on at least one of the accident history data, the navigation data, and the live information, the determining being performed by the processor.*

* * * * *

UNITED STATES PATENT AND TRADEMARK OFFICE

CERTIFICATE OF CORRECTION

PATENT NO. : RE41,271 E
APPLICATION NO. : 11/896497
DATED : April 27, 2010
INVENTOR(S) : Theodore F. Vaida It is certified that error appears in the above-identified patent and that said Letters Patent is hereby corrected as shown below:

Column 11, Line 24
Please replace “a data” with --a flight--

Signed and Sealed this
Twenty-eighth Day of June, 2011

David J. Kappos
*Director of the United States Patent and Trademark Office*